(12) United States Patent
Massarwa et al.

(10) Patent No.: US 12,543,995 B2
(45) Date of Patent: Feb. 10, 2026

(54) METHODS AND SYSTEMS FOR SHAVING AN ANATOMICAL MAP

(71) Applicant: Biosense Webster (Israel) Ltd., Yokneam (IL)

(72) Inventors: Fady Massarwa, Baka Al Gharbiyya (IL); Meytal Segev, Haifa (IL); Akram Zoabi, Yokneam (IL); Sigal Altman, Ramat Hashofet (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 299 days.

(21) Appl. No.: 18/227,432

(22) Filed: Jul. 28, 2023

(65) Prior Publication Data

US 2025/0032035 A1 Jan. 30, 2025

(51) Int. Cl.
| | | |
|---|---|---|
| *A61B 5/36* | (2021.01) | |
| *A61B 5/00* | (2006.01) | |
| *A61B 5/287* | (2021.01) | |
| *A61B 5/367* | (2021.01) | |
| *G16H 30/40* | (2018.01) | |

(52) U.S. Cl.
CPC ............ *A61B 5/367* (2021.01); *A61B 5/0044* (2013.01); *A61B 5/287* (2021.01); *G16H 30/40* (2018.01)

(58) Field of Classification Search
CPC ............ A61B 2576/023; A61B 5/0006; A61B 5/0022; A61B 5/0044; A61B 5/01; A61B 5/02055; A61B 5/0538; A61B 5/14532; A61B 5/287; A61B 5/343; A61B 5/367; A61B 5/6853; A61B 5/6859; A61B 5/7221; A61B 5/743; A61B 8/0883; G06T 7/0014; G16H 30/40
See application file for complete search history.

(56) References Cited

U.S. PATENT DOCUMENTS

| | | |
|---|---|---|
| 5,391,199 A | 2/1995 | Ben-Haim |
| 5,443,489 A | 8/1995 | Ben-Haim |
| 5,558,091 A | 9/1996 | Acker et al. |
| 6,172,499 B1 | 1/2001 | Ashe |
| 6,239,724 B1 | 5/2001 | Doron et al. |
| 6,332,089 B1 | 12/2001 | Acker et al. |
| 6,484,118 B1 | 11/2002 | Govari |
| 6,618,612 B1 | 9/2003 | Acker et al. |
| 6,690,963 B2 | 2/2004 | Ben-Haim et al. |
| 6,788,967 B2 | 9/2004 | Ben-Haim et al. |

(Continued)

OTHER PUBLICATIONS

Extended European Search Report issued on Jan. 7, 2025 for European Patent Application No. 24191042.1.

(Continued)

*Primary Examiner* — Ankit D Tejani
(74) *Attorney, Agent, or Firm* — Volpe Koenig

(57) ABSTRACT

A system and method for shaving an anatomical map. A reference image is compared to the—anatomical map using an accuracy parameter, and at least one area in the anatomical map that fails to meet the accuracy parameter is identified. An image of the electro-anatomical map is displayed, where the image provides a visual indication of the at least one area in the anatomical map that fails to meet the at least one accuracy parameter. A revised map is generated by shaving the at least one area in the anatomical map that fails to meet the at least one accuracy parameter, and the revised map is displayed.

20 Claims, 12 Drawing Sheets

(56) References Cited

U.S. PATENT DOCUMENTS

| | | | |
|---|---|---|---|
| 6,892,091 | B1 | 5/2005 | Ben-Haim et al. |
| 7,536,218 | B2 | 5/2009 | Govari et al. |
| 7,715,604 | B2 | 5/2010 | Sun et al. |
| 7,756,576 | B2 | 7/2010 | Levin |
| 7,848,787 | B2 | 12/2010 | Osadchy |
| 7,869,865 | B2 | 1/2011 | Govari et al. |
| 8,456,182 | B2 | 6/2013 | Bar-tal et al. |
| 9,576,107 | B2 | 2/2017 | Safran et al. |
| 9,955,920 | B2 | 5/2018 | Shushan et al. |
| 10,835,143 | B2 | 11/2020 | Stewart et al. |
| 2015/0157267 | A1 | 6/2015 | Shushan et al. |
| 2017/0202469 | A1* | 7/2017 | Scharf ............... A61B 8/12 |
| 2019/0069954 | A1 | 3/2019 | Cohen et al. |
| 2022/0225924 | A1 | 7/2022 | Katz et al. |
| 2022/0225925 | A1* | 7/2022 | Cohen ............... A61B 34/20 |

OTHER PUBLICATIONS

"Evaluation of Cartosound Fam Software for Accurate Reconstruction of the Left Atrium," Available at: https://classic.clinicaltrials.gov/ct2/show/NCT04600245 (Oct. 23, 2020).

Schramm et al., "Approximating anatomically-guided PET reconstruction in image space using a convolutional neural network," NeuroImage, vol. 224, (2021).

* cited by examiner

METHODS AND SYSTEMS FOR SHAVING AN ANATOMICAL MAP

FIELD OF INVENTION

The present disclosure relates generally to anatomical mapping systems. More particularly, the disclosure relates to methods and systems for shaving anatomical maps including, for example, electroanatomical maps of the heart.

BACKGROUND

An interior of an organ of a patient, such as a cardiac cavity, can be mapped using a mapping catheter (e.g., electroanatomically mapped) having one or more suitable sensors fitted at its distal end for mapping within the organ. Using location signals generated by the various sensors, a processor may calculate the sensor locations within the organ (e.g., the cardiac cavity). Using the calculated locations, the processor may further derive an anatomical map of the cavity surface. For example, in a fast-anatomical mapping (FAM) of a heart chamber, point positions on an inner surface of the cavity are drawn using acquired electroanatomical (EA) data. However, undesired catheter positions may also be acquired and automatically added to the FAM-constructed cavity surface during FAM reconstruction. Examples of such undesired data points include cavity wall positions distorted by being pushed outwards by the catheter, wrong wall positions due to respiration-induced movement, positions measured erroneously in the interior of the cavity instead of on the surface, and irrelevant catheter positions, e.g., outside a mapping area of interest.

Accumulation of such undesired positions affects the accuracy of the reconstructed EA map. To address these inaccuracies, during or after acquisition, a physician, or a specialist helping the physician, may manually edit the surface generated from the acquired points to correct for the errors. This editing typically involves erasing data points and/or removing ("shaving") portions from the computed surface. When performed manually, such editing can be time-consuming and lack accuracy.

SUMMARY

A system and method for shaving an anatomical map. A reference image is compared to the anatomical map using an accuracy parameter, and at least one area in the anatomical map that fails to meet the accuracy parameter is identified. An image of the anatomical map is displayed, where the image provides a visual indication of the at least one area in the anatomical map that fails to meet the at least one accuracy parameter. A revised map is generated by shaving the at least one area in the anatomical map that fails to meet the at least one accuracy parameter, and the revised map is displayed.

In some embodiments, the anatomical map is a fast anatomical map (FAM) acquired during an electrophysiological investigation, and the reference image is a CT image, Ultrasound Image (2D, 3D, or 4D), MRI image, or an anatomical map shaved during a prior electrophysiological investigation. In one embodiment, the shaving is initiated manually by a user viewing the visual indication. Alternatively, the shaving is automated and performed without input from a user to initiate shaving of the area that fails to meet the accuracy parameter.

In one embodiment, the at least one accuracy parameter comprises a maximal distance between the anatomical map and the reference image. In other embodiments, accuracy is determined based on both the maximal distance and a point density value or a point quality value. In some examples, the accuracy parameter is configured by a user performing an electrophysiological investigation.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1:
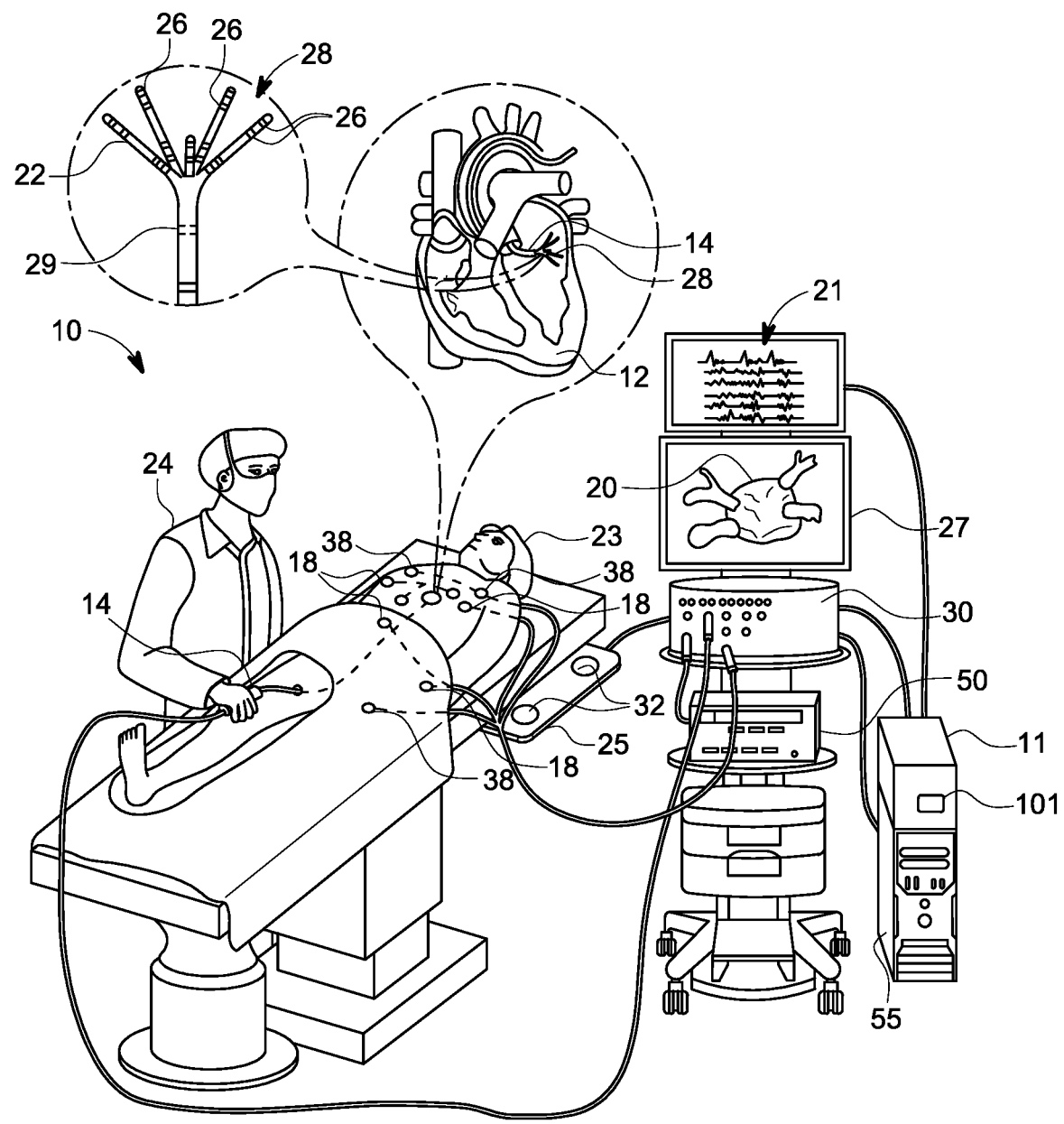
FIG. 1 depicts an example catheter-based electrophysiology mapping and ablation system according to one or more embodiments.

A system and method for shaving an electroanatomical map. A reference image is compared to the electroanatomical map using at least one accuracy parameter, and at least one area in the anatomical map that fails to meet the at least one accuracy parameter is identified. An image of the electroanatomical map is displayed, where the image provides a visual indication of the at least one area in the electroanatomical map that fails to meet the at least one accuracy parameter. A revised map is generated by shaving the at least one area in the electroanatomical map that fails to meet the at least one accuracy parameter, and the revised map is displayed.

One or more advantages, technical effects, and/or benefits can include providing cardiac physicians and medical personnel information to enhance organ mapping, such as a cardiac mapping. Thus, the system and method and user interface particularly utilizes and transforms medical device equipment to enable/implement organ mapping with increased efficiency and quality that are otherwise not currently available or currently performed by cardiac physicians and medical personnel.

In one embodiment, the system for shaving the electroanatomical map includes a processor, memory, a display and a user interface. The processor receives, via the user-interface, at least one accuracy parameter. In an example, the accuracy parameter represents a maximal distance between the electroanatomical map and a reference image. In other embodiments, more than one accuracy parameter is used. For example, both the maximal distance in combination with either a point density value or a point quality value are used. In some examples, a user configures the at least one accuracy parameter via the user-interface when performing an electrophysiological investigation. The system identifies at least one area in the electroanatomical map that fails to meet the at least one accuracy parameter by comparing the electroanatomical map to a reference image. In some embodiments, the electroanatomical map is a fast anatomical map (FAM) acquired during an electrophysiological investigation, and the reference image is a CT image, MRI image, ultrasound image, or an electro-anatomical map shaved during a prior electrophysiological investigation of the same patient, or another map that has been processed to make the map more accurate. An image of the electroanatomical map is shown on the display, wherein the image provides a visual indication of the at least one area in the electroanatomical map that fails to meet the at least one accuracy parameter. A revised map is generated by shaving the at least one area in the electroanatomical map that fails to meet the at least one accuracy parameter, and the revised map is shown on the display. In one embodiment, the shaving is initiated manually by a user viewing the visual indication. Alternatively, the shaving is automated and performed without input from a user to initiate shaving of the area that fails to meet the at least one accuracy parameter.

Reference is made to FIG. 1 showing an example system (e.g., medical device equipment and/or catheter-based electrophysiology mapping and ablation), shown as system 10, in which one or more features of the subject matter herein can be implemented according to one or more embodiments. All or part of the system 100 can be used to collect information (e.g., biometric data and/or a training dataset) and/or used to implement a machine learning and/or an artificial intelligence algorithm as described herein. The system 10, as illustrated, includes a recorder 11, a heart 12, a catheter 14, a model or anatomical map 20, an electrogram 21, a spline 22, a patient 23, a physician 24 (or a medical professional or clinician), a location pad 25, an electrode 26, a display device 27, a distal tip 28, a sensor 29, a coil 32, a patient interface unit (PIU) 30, electrode skin patches 38, an ablation energy generator 50, and a workstation 55. Note further each element and/or item of the system 10 is representative of one or more of that element and/or that item. The example of the system 10 shown in FIG. 1 can be modified to implement the embodiments disclosed herein. The disclosed embodiments can similarly be applied using other system components and settings. Additionally, the system 10 can include additional components, such as elements for sensing electrical activity, wired or wireless connectors, processing and display devices, or the like. While the heart 12, patient 23, and physician 24 are described in association with the example system for completeness, one of skill in the art would understand that the heart 12, patient 23, and physician 24 are not a part of the system itself, and instead the system works on or on behalf of these elements.

The system 10 includes multiple catheters 14, which are percutaneously inserted by the physician 24 through the patient's vascular system into a chamber or vascular structure of the heart 12. Typically, a delivery sheath catheter is inserted into the left or right atrium near a desired location in the heart 12. Thereafter, a plurality of catheters can be inserted into the delivery sheath catheter so as to arrive at the desired location. The plurality of catheters 14 may include catheters dedicated for sensing Intracardiac Electrogram (IEGM) signals, catheters dedicated for ablating and/or catheters dedicated for both sensing and ablating. The example catheter 14 that is configured for sensing IEGM is illustrated herein. The physician 24 brings the distal tip 28 of the catheter 14 into contact with the heart wall for sensing a target site in the heart 12. For ablation, the physician 24 would similarly bring a distal end of an ablation catheter to a target site for ablating.

The catheter 14 is an exemplary catheter that includes one and preferably multiple electrodes 26 optionally distributed over a plurality of splines 22 at the distal tip 28 and configured to sense the IEGM signals. The catheter 14 may additionally include the sensor 29 embedded in or near the distal tip 28 for tracking position and orientation of the distal tip 28. Optionally and preferably, position sensor 29 is a magnetic based position sensor including three magnetic coils for sensing three-dimensional (3D) position and orientation.

The sensor 29 (e.g., a position or a magnetic based position sensor) may be operated together with the location pad 25 including a plurality of magnetic coils 32 configured to generate magnetic fields in a predefined working volume. Real time position of the distal tip 28 of the catheter 14 may be tracked based on magnetic fields generated with the location pad 25 and sensed by the sensor 29. Details of the magnetic based position sensing technology are described in U.S. Pat. Nos. 5,5391,199; 5,443,489; 5,558,091; 6,172,499; 6,239,724; 6,332,089; 6,484,118; 6,618,612; 6,690,963; 6,788,967; 6,892,091.

The system 10 includes one or more electrode patches 38 positioned for skin contact on the patient 23 to establish location reference for the location pad 25 as well as impedance-based tracking of the electrodes 26. For impedance-based tracking, electrical current is directed toward the electrodes 26 and sensed at the patches 38 (e.g., electrode skin patches) so that the location of each electrode can be triangulated via the patches 38. Details of the impedance-based location tracking technology are described in U.S. Pat. Nos. 7,536,218; 7,756,576; 7,848,787; 7,869,865; and 8,456,182, which are incorporated herein by reference.

The recorder 11 displays the electrograms 21 captured with the electrodes 18 (e.g., body surface electrocardiogram (ECG) electrodes) and intracardiac electrograms (IEGM) captured with the electrodes 26 of the catheter 14. The recorder 11 may include pacing capability for pacing the heart rhythm and/or may be electrically connected to a standalone pacer.

The system 10 may include the ablation energy generator 50 that is adapted to conduct ablative energy to the one or more of electrodes 26 at the distal tip 28 of the catheter 14 configured for ablating. Energy produced by the ablation energy generator 50 may include, but is not limited to, radiofrequency (RF) energy or pulsed-field ablation (PFA) energy, including monopolar or bipolar high-voltage DC pulses as may be used to effect irreversible electroporation (IRE), or combinations thereof.

The PIU 30 is an interface configured to establish electrical communication between catheters, electrophysiological equipment, power supply and the workstation 55 for controlling operation of the system 10. Electrophysiological equipment of the system 10 may include for example, multiple catheters 14, the location pad 25, the body surface ECG electrodes 18, the electrode patches 38, the ablation energy generator 50, and the recorder 11. Optionally and preferably, the PIU 30 additionally includes processing capability for implementing real-time computations of location of the catheters and for performing ECG calculations.

The workstation 55 includes memory, a processor unit with memory or storage with appropriate operating software loaded therein, and user interface capability. The workstation 55 may provide multiple functions, optionally including: (1) modeling the endocardial anatomy in three-dimensions (3D) and rendering the model or anatomical map 20 for display on the display device 27, (2) displaying on the display device 27 activation sequences (or other data) compiled from recorded electrograms 21 in representative visual indicia or imagery superimposed on the rendered anatomical map 20, (3) displaying real-time location and orientation of multiple catheters within the heart chamber, and (5) displaying on the display device 27 sites of interest such as places where ablation energy has been applied. One commercial product embodying elements of the system 10 is available as the CARTO™ 3 System, available from Biosense Webster, Inc., 31A Technology Drive, Irvine, CA 92618.

For instance, the system 10 can be part of a surgical system (e.g., CARTO® system sold by Biosense Webster) that is configured to obtain biometric data (e.g., anatomical and electrical measurements of a patient's organ, such as the heart 12 and as described herein) and perform a cardiac ablation procedure. More particularly, treatments for cardiac conditions such as cardiac arrhythmia often require obtaining a detailed mapping of cardiac tissue, chambers, veins, arteries and/or electrical pathways. For example, a prerequisite for performing a catheter ablation (as described herein) successfully is that the cause of the cardiac arrhythmia is accurately located in a chamber of the heart 12. Such locating may be done via an electrophysiological investigation during which electrical potentials are detected spatially resolved with a mapping catheter (e.g., the catheter 14) introduced into the chamber of the heart 12. This electrophysiological investigation, the so-called electro-anatomical mapping, thus provides 3D mapping data which can be displayed on the display device 27. In many cases, the mapping function and a treatment function (e.g., ablation) are provided by a single catheter or group of catheters such that the mapping catheter also operates as a treatment (e.g., ablation) catheter at the same time. In one example, system 10 obtains a fast-anatomical mapping (FAM) of a heart chamber, where point positions on an inner surface of the cavity are drawn using acquired electroanatomical data.

Figure 2:
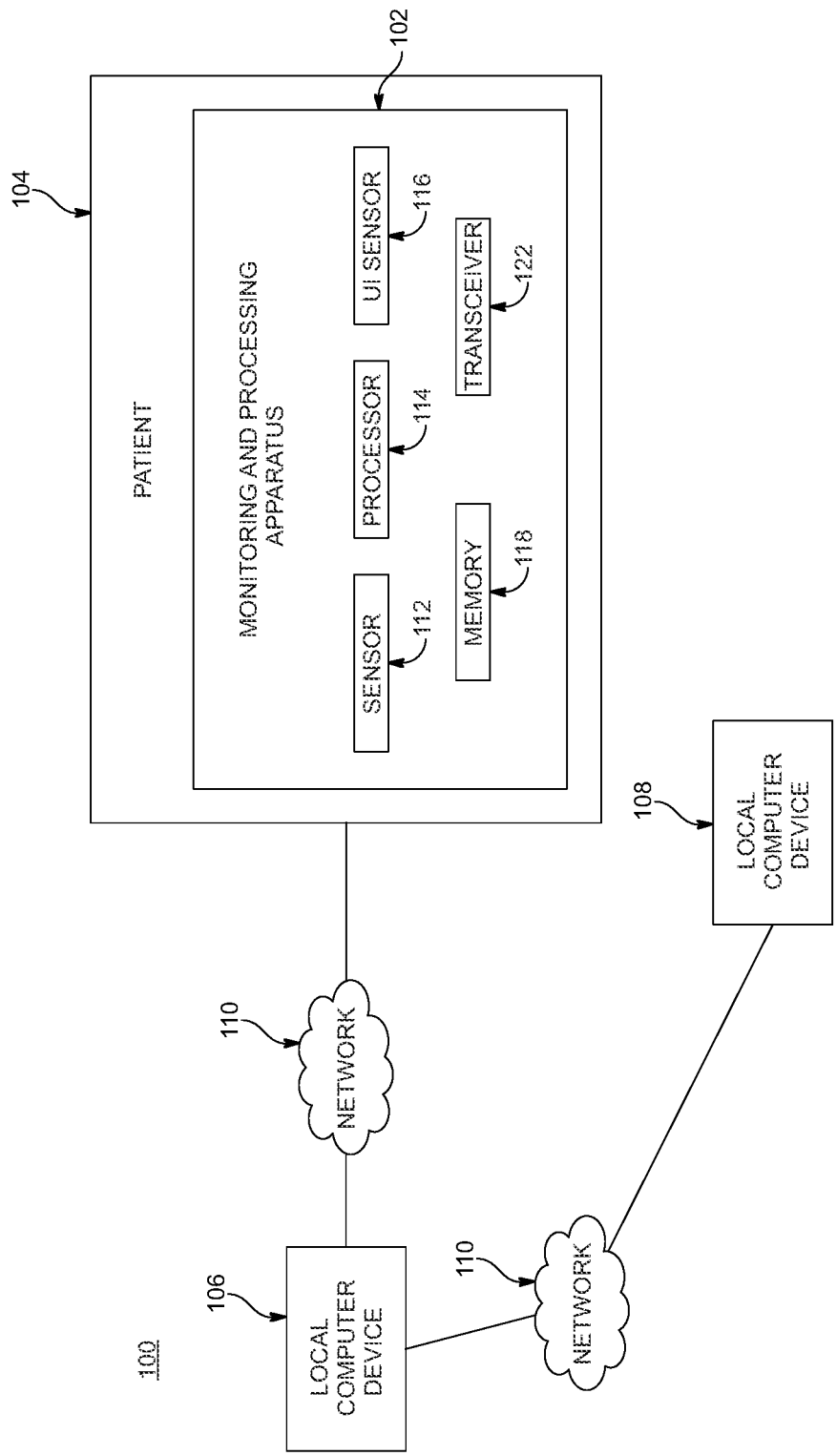
FIG. 2 is a block diagram of an example system for remotely monitoring and communicating patient biometrics according to one or more embodiments.

FIG. 2 is a block diagram of an example system 100 for remotely monitoring and communicating patient biometrics (i.e., patient data). In the example illustrated in FIG. 2, the system 100 includes a patient biometric monitoring and processing apparatus 102 associated with a patient 104, a local computing device 106, a remote computing system 108, a first network 110, a patient biometric sensor 112, a processor 114, a user input (UI) sensor 116, a memory 118, a second network 120, and a transmitter-receiver (i.e., transceiver) 122.

According to an embodiment, the patient biometric monitoring and processing apparatus 102 may be an apparatus that is internal to the patient's body (e.g., subcutaneously implantable), such as the catheter 14 of FIG. 1. The patient biometric monitoring and processing apparatus 102 may be inserted into a patient via any applicable manner including orally injecting, surgical insertion via a vein or artery, an endoscopic procedure, or a laparoscopic procedure.

According to an embodiment, the patient biometric monitoring and processing apparatus 102 may be an apparatus that is external to the patient, such as the electrode patches 38 of FIG. 1. For example, as described in more detail below, the patient biometric monitoring and processing apparatus 102 may include an attachable patch (e.g., that attaches to a patient's skin). The monitoring and processing apparatus 102 may also include a catheter with one or more electrodes, a probe, a blood pressure cuff, a weight scale, a bracelet or smart watch biometric tracker, a glucose monitor, a continuous positive airway pressure (CPAP) machine or virtually any device which may provide an input concerning the health or biometrics of the patient.

According to an embodiment, the patient biometric monitoring and processing apparatus 102 may include both components that are internal to the patient and components that are external to the patient.

The single patient biometric monitoring and processing apparatus 102 is shown in FIG. 2. Example systems may, however, may include a plurality of patient biometric monitoring and processing apparatuses. A patient biometric monitoring and processing apparatus may be in communication with one or more other patient biometric monitoring and processing apparatuses. Additionally or alternatively, a patient biometric monitoring and processing apparatus may be in communication with the network 110.

One or more patient biometric monitoring and processing apparatuses 102 may acquire patient biometric data (e.g., electrical signals, blood pressure, temperature, blood glucose level or other biometric data) and receive at least a portion of the patient biometric data representing the acquired patient biometrics and additional formation associated with acquired patient biometrics from one or more other patient biometric monitoring and processing apparatuses 102. The additional information may be, for example, diagnosis information and/or additional information obtained from an additional device such as a wearable device. Each of the patient biometric monitoring and processing apparatus 102 may process data, including its own acquired patient biometrics as well as data received from one or more other patient biometric monitoring and processing apparatuses 102.

Biometric data (e.g., patient biometrics, patient data, or patient biometric data) can include one or more of local activation times (LATs), electrical activity, topology, bipolar mapping, reference activity, ventricle activity, dominant frequency, impedance, or the like. The LAT can be a point in time of a threshold activity corresponding to a local activation, calculated based on a normalized initial starting point. Electrical activity can be any applicable electrical signals that can be measured based on one or more thresholds and can be sensed and/or augmented based on signal to noise ratios and/or other filters. A topology can correspond to the physical structure of a body part or a portion of a body part and can correspond to changes in the physical structure relative to different parts of the body part or relative to different body parts. A dominant frequency can be a frequency or a range of frequencies that are prevalent at a portion of a body part and can be different in different portions of the same body part. For example, the dominant frequency of a PV of a heart can be different than the dominant frequency of the right atrium of the same heart. Impedance can be the resistance measurement at a given area of a body part.

Examples of biometric data include, but are not limited to, patient identification data, intracardiac electrocardiogram (IC ECG) data, bipolar intracardiac reference signals, anatomical and electrical measurements, trajectory information, body surface (BS) ECG data, historical data, brain biometrics, blood pressure data, ultrasound signals, radio signals, audio signals, a two- or three-dimensional image data, blood glucose data, and temperature data. The biometrics data can be used, generally, to monitor, diagnosis, and treatment any number of various diseases, such as cardiovascular diseases (e.g., arrhythmias, cardiomyopathy, and coronary artery disease) and autoimmune diseases (e.g., type I and type II diabetes). Note that BS ECG data can include data and signals collected from electrodes on a surface of a patient, IC ECG data can include data and signals collected from electrodes within the patient, and ablation data can include data and signals collected from tissue that has been ablated. Further, BS ECG data, IC ECG data, and ablation data, along with catheter electrode position data, can be derived from one or more procedure recordings.

In FIG. 2, the network 110 is an example of a short-range network (e.g., local area network (LAN), or personal area network (PAN)). Information may be sent, via the network 110, between the patient biometric monitoring and processing apparatus 102 and the local computing device 106 using any one of various short-range wireless communication protocols, such as Bluetooth, Wi-Fi, Zigbee, Z-Wave, near field communications (NFC), ultraband, Zigbee, or infrared (IR).

The network 120 may be a wired network, a wireless network or include one or more wired and wireless networks. For example, the network 120 may be a long-range network (e.g., a wide area network (WAN), the internet, or a cellular network,). Information may be sent, via the network 120 using any one of various long-range wireless communication protocols (e.g., TCP/IP, HTTP, 3G, 4G/LTE, or 5G/New Radio).

The patient biometric monitoring and processing apparatus 102 may include the patient biometric sensor 112, the processor 114, the UI sensor 116, the memory 118, and the transceiver 122. The patient biometric monitoring and processing apparatus 102 may continually or periodically monitor, store, process and communicate, via the network 110, any number of various patient biometrics. Examples of patient biometrics include electrical signals (e.g., ECG signals and brain biometrics), blood pressure data, blood glucose data and temperature data. The patient biometrics may be monitored and communicated for treatment across any number of various diseases, such as cardiovascular diseases (e.g., arrhythmias, cardiomyopathy, and coronary artery disease) and autoimmune diseases (e.g., type I and type II diabetes).

The patient biometric sensor 112 may include, for example, one or more sensors configured to sense a type of biometric patient biometrics. For example, the patient biometric sensor 112 may include an electrode configured to acquire electrical signals (e.g., heart signals, brain signals or other bioelectrical signals), a temperature sensor, a blood pressure sensor, a blood glucose sensor, a blood oxygen sensor, a pH sensor, an accelerometer and a microphone.

As described in more detail below, the patient biometric monitoring and processing apparatus 102 may be an ECG monitor for monitoring ECG signals of a heart (e.g., the heart 12). The patient biometric sensor 112 of the ECG monitor may include one or more electrodes for acquiring ECG signals. The ECG signals may be used for treatment of various cardiovascular diseases.

In another example, the patient biometric monitoring and processing apparatus 102 may be a continuous glucose monitor (CGM) for continuously monitoring blood glucose levels of a patient on a continual basis for treatment of various diseases, such as type I and type II diabetes. The CGM may include a subcutaneously disposed electrode, which may monitor blood glucose levels from interstitial fluid of the patient. The CGM may be, for example, a component of a closed-loop system in which the blood glucose data is sent to an insulin pump for calculated delivery of insulin without user intervention.

The transceiver 122 may include a separate transmitter and receiver. Alternatively, the transceiver 122 may include a transmitter and receiver integrated into a single device.

The processor 114 may be configured to store patient data, such as patient biometric data in the memory 118 acquired by the patient biometric sensor 112, and communicate the patient data, across the network 110, via a transmitter of the transceiver 122. Data from one or more other patient biometric monitoring and processing apparatus 102 may also be received by a receiver of the transceiver 122, as described in more detail below.

According to an embodiment, the patient biometric monitoring and processing apparatus 102 includes UI sensor 116 which may be, for example, a piezoelectric sensor or a capacitive sensor configured to receive a user input, such as a tapping or touching. For example, the UI sensor 116 may be controlled to implement a capacitive coupling, in response to tapping or touching a surface of the patient biometric monitoring and processing apparatus 102 by the patient 104. Gesture recognition may be implemented via any one of various capacitive types, such as resistive capacitive, surface capacitive, projected capacitive, surface acoustic wave, piezoelectric and infra-red touching. Capacitive sensors may be disposed at a small area or over a length of the surface such that the tapping or touching of the surface activates the monitoring device.

As described in more detail below, the processor 114 may be configured to respond selectively to different tapping patterns of the capacitive sensor (e.g., a single tap or a double tap), which may be the UI sensor 116, such that different tasks of the patch (e.g., acquisition, storing, or transmission of data) may be activated based on the detected pattern. In some embodiments, audible feedback may be given to the user from the patient biometric monitoring and processing apparatus 102 when a gesture is detected.

The local computing device 106 of the system 100 is in communication with the patient biometric monitoring and processing apparatus 102 and may be configured to act as a gateway to the remote computing system 108 through the second network 120. The local computing device 106 may be, for example, a, smart phone, smartwatch, tablet or other portable smart device configured to communicate with other devices via the network 120. Alternatively, the local computing device 106 may be a stationary or standalone device, such as a stationary base station including, for example, modem and/or router capability, a desktop or laptop computer using an executable program to communicate information between the patient biometric monitoring and processing apparatus 102 and the remote computing system 108 via the PC's radio module, or a USB dongle. Patient biometrics may be communicated between the local computing device 106 and the patient biometric monitoring and processing apparatus 102 using a short-range wireless technology standard (e.g., Bluetooth, Wi-Fi, ZigBee, Z-wave and other short-range wireless standards) via the short-range wireless network 110, such as a local area network (LAN) (e.g., a personal area network (PAN)). In some embodiments, the local computing device 106 may also be configured to display the acquired patient electrical signals and information associated with the acquired patient electrical signals, as described in more detail below.

In some embodiments, the remote computing system 108 may be configured to receive at least one of the monitored patient biometrics and information associated with the monitored patient via network 120, which is a long-range network. For example, if the local computing device 106 is a mobile phone, network 120 may be a wireless cellular network, and information may be communicated between the local computing device 106 and the remote computing system 108 via a wireless technology standard, such as any of the wireless technologies mentioned above. As described in more detail below, the remote computing system 108 may be configured to provide (e.g., visually display and/or aurally provide) the at least one of the patient biometrics and the associated information to a healthcare professional (e.g., a physician).

Figure 3:
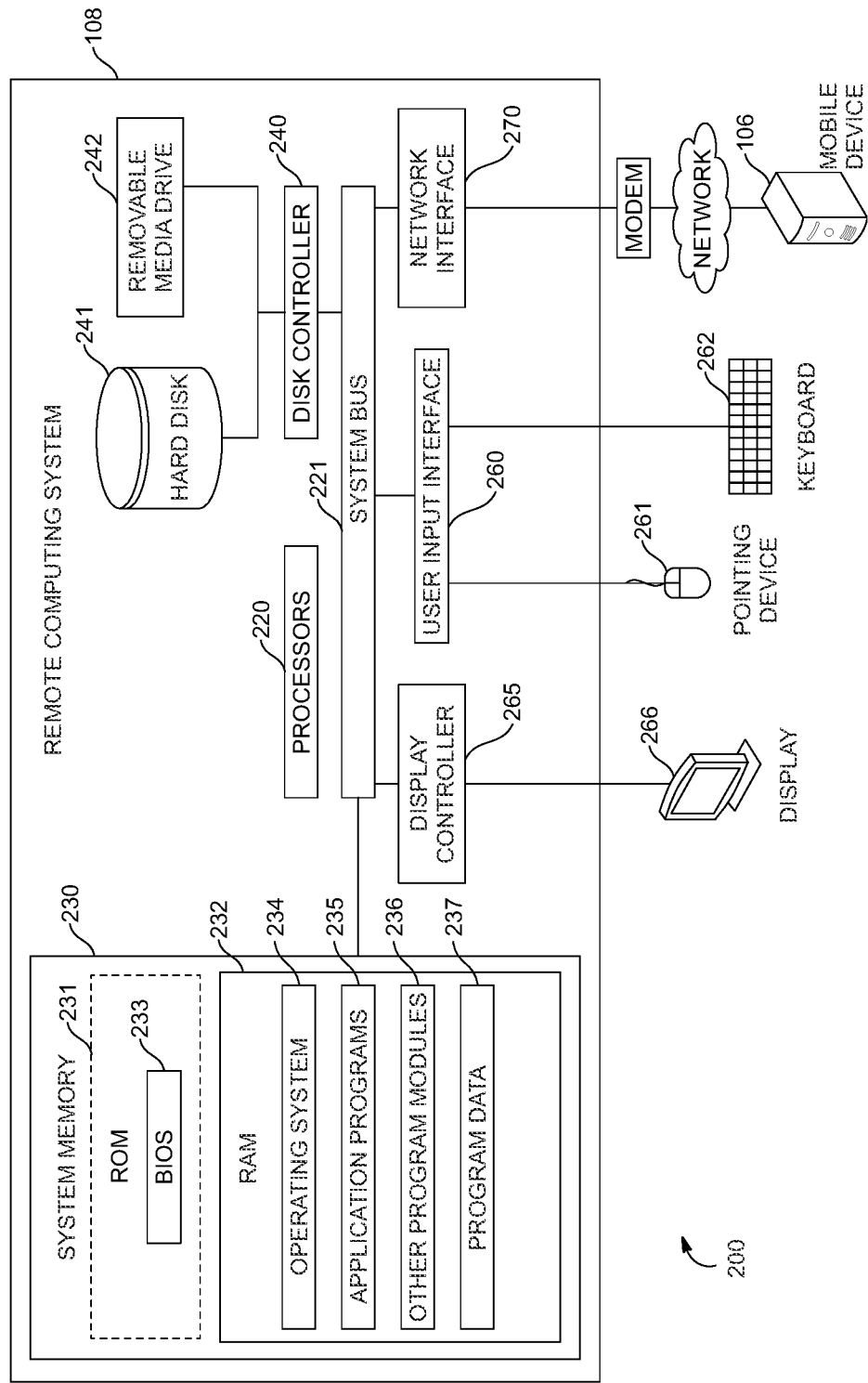
FIG. 3 is a system diagram of an example of a computing environment in communication with network according to one or more embodiments.

FIG. 3 is a system diagram of an example of a computing environment 200 in communication with network 120. In some instances, the computing environment 200 is incorporated in a public cloud computing platform (such as Amazon Web Services or Microsoft Azure), a hybrid cloud computing platform (such as HP Enterprise OneSphere) or a private cloud computing platform.

As shown in FIG. 3, computing environment 200 includes remote computing system 108 (hereinafter computer system), which is one example of a computing system upon which embodiments described herein may be implemented.

The remote computing system 108 may, via processors 220, which may include one or more processors, perform various functions. The functions may include analyzing monitored patient biometrics and the associated information and, according to physician-determined or algorithm driven thresholds and parameters, providing (e.g., via display 266) alerts, additional information or instructions. As described in more detail below, the remote computing system 108 may be used to provide (e.g., via display 266) healthcare personnel (e.g., a physician) with a dashboard of patient information, such that such information may enable healthcare personnel to identify and prioritize patients having more critical needs than others.

As shown in FIG. 3, the computer system 210 may include a communication mechanism such as a bus 221 or other communication mechanism for communicating information within the computer system 210. The computer system 210 further includes one or more processors 220 coupled with the bus 221 for processing the information. The processors 220 may include one or more CPUs, GPUs, or any other processor known in the art.

The computer system 210 also includes a system memory 230 coupled to the bus 221 for storing information and instructions to be executed by processors 220. The system memory 230 may include computer readable storage media in the form of volatile and/or nonvolatile memory, such as read only system memory (ROM) 231 and/or random-access memory (RAM) 232. The system memory RAM 232 may include other dynamic storage device(s) (e.g., dynamic RAM, static RAM, and synchronous DRAM). The system memory ROM 231 may include other static storage device (s) (e.g., programmable ROM, erasable PROM, and electrically erasable PROM). In addition, the system memory 230 may be used for storing temporary variables or other intermediate information during the execution of instructions by the processors 220. A basic input/output system 233 (BIOS) may contain routines to transfer information between elements within computer system 210, such as during start-up, that may be stored in system memory ROM 231. RAM 232 may comprise data and/or program modules that are immediately accessible to and/or presently being operated on by the processors 220. System memory 230 may additionally include, for example, operating system 234, application programs 235, other program modules 236 and program data 237.

The illustrated computer system 210 also includes a disk controller 240 coupled to the bus 221 to control one or more storage devices for storing information and instructions, such as a magnetic hard disk 241 and a removable media drive 242 (e.g., floppy disk drive, compact disc drive, tape drive, and/or solid-state drive). The storage devices may be added to the computer system 210 using an appropriate device interface (e.g., a small computer system interface (SCSI), integrated device electronics (IDE), Universal Serial Bus (USB), or FireWire).

The computer system 210 may also include a display controller 265 coupled to the bus 221 to control a monitor or display 266, such as a cathode ray tube (CRT) or liquid crystal display (LCD), for displaying information to a computer user. The illustrated computer system 210 includes a user input interface 260 and one or more input devices, such as a keyboard 262 and a pointing device 261, for interacting with a computer user and providing information to the processor 220. The pointing device 261, for example, may be a mouse, a trackball, or a pointing stick for communicating direction information and command selections to the processor 220 and for controlling cursor movement on the display 266. The display 266 may provide a touch screen interface that may allow input to supplement or replace the communication of direction information and command selections by the pointing device 261 and/or keyboard 262.

The computer system 210 may perform a portion or each of the functions and methods described herein in response to the processors 220 executing one or more sequences of one or more instructions contained in a memory, such as the system memory 230. Such instructions may be read into the system memory 230 from another computer readable medium, such as a hard disk 241 or a removable media drive 242. The hard disk 241 may contain one or more data stores and data files used by embodiments described herein. Data store contents and data files may be encrypted to improve security. The processors 220 may also be employed in a multi-processing arrangement to execute the one or more sequences of instructions contained in system memory 230. In alternative embodiments, hard-wired circuitry may be used in place of or in combination with software instructions. Thus, embodiments are not limited to any specific combination of hardware circuitry and software.

As stated above, the computer system 210 may include at least one computer readable medium or memory for holding instructions programmed according to embodiments described herein and for containing data structures, tables, records, or other data described herein. The term computer readable medium as used herein refers to any non-transitory, tangible medium that participates in providing instructions to the processor 220 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 241 or removable media drive 242. Non-limiting examples of volatile media include dynamic memory, such as system memory 230. Non-limiting examples of transmission media include coaxial cables, copper wire, and fiber optics, including the wires that make up the bus 221. Transmission media may also take the form of acoustic or light waves, such as those generated during radio wave and infrared data communications.

The computing environment 200 may further include the computer system 210 operating in a networked environment using logical connections to local computing device 106 and one or more other devices, such as a personal computer (laptop or desktop), mobile devices (e.g., patient mobile devices), a server, a router, a network PC, a peer device or other common network node, and typically includes many or all of the elements described above relative to computer system 210. When used in a networking environment, computer system 210 may include modem 272 for establishing communications over a network 120, such as the Internet. Modem 272 may be connected to system bus 221 via network interface 270, or via another appropriate mechanism.

Network 120, as shown in FIGS. 2 and 3, may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., local computing device 106).

Treatments for cardiac conditions such as cardiac arrhythmia often require obtaining a detailed mapping of cardiac tissue, chambers, veins, arteries and/or electrical pathways. For example, a prerequisite for performing a catheter ablation successfully is that the cause of the cardiac arrhythmia is accurately located in the heart chamber. Such locating may be done via an electrophysiological investigation during which electrical potentials are detected spatially resolved with a mapping catheter introduced into the heart chamber. This electrophysiological investigation, the so-called electro-anatomical mapping, thus provides 3D mapping data which can be displayed on a monitor. In many cases, the mapping function and a treatment function (e.g., ablation) are provided by a single catheter or group of catheters such that the mapping catheter also operates as a treatment (e.g., ablation) catheter at the same time.

Mapping of cardiac areas such as cardiac regions, tissue, veins, arteries and/or electrical pathways of the heart may result in identifying problem areas such as scar tissue, arrythmia sources (e.g., electric rotors), healthy areas, and the like. Cardiac areas may be mapped such that a visual rendering of the mapped cardiac areas is provided using a display, as further disclosed herein. Additionally, cardiac mapping may include mapping based on one or more modalities such as, but not limited to local activation time (LAT), an electrical activity, a topology, a bipolar mapping, a dominant frequency, or an impedance. Data corresponding to multiple modalities may be captured using a catheter inserted into a patient's body and may be provided for rendering at the same time or at different times based on corresponding settings and/or preferences of a medical professional.

Cardiac mapping may be implemented using one or more techniques. As an example of a first technique, cardiac mapping may be implemented by sensing an electrical property of heart tissue, for example, local activation time, as a function of the precise location within the heart. The corresponding data may be acquired with one or more catheters that are advanced into the heart using catheters that have electrical and location sensors in their distal tips. As specific examples, location and electrical activity may be initially measured on about 10 to about 20 points on the interior surface of the heart. These data points may be generally sufficient to generate a preliminary reconstruction or map of the cardiac surface to a satisfactory quality. The preliminary map may be combined with data taken at additional points in order to generate a more comprehensive map of the heart's electrical activity. In clinical settings, it is not uncommon to accumulate data at 100 or more sites to generate a detailed, comprehensive map of heart chamber electrical activity. The generated detailed map may then serve as the basis for deciding on a therapeutic course of action, for example, tissue ablation, to alter the propagation of the heart's electrical activity and to restore normal heart rhythm.

Catheters containing position sensors may be used to determine the trajectory of points on the cardiac surface. These trajectories may be used to infer motion characteristics such as the contractility of the tissue. Maps depicting such motion characteristics may be constructed when the trajectory information is sampled at a sufficient number of points in the heart.

Electrical activity at a point in the heart may be typically measured by advancing a catheter containing an electrical sensor at or near its distal tip to that point in the heart, contacting the tissue with the sensor and acquiring data at that point. One drawback with mapping a cardiac chamber using a catheter containing only a single, distal tip electrode is the long period of time required to accumulate data on a point-by-point basis over the requisite number of points required for a detailed map of the chamber as a whole. Accordingly, multiple-electrode catheters have been developed to simultaneously measure electrical activity at multiple points in the heart chamber.

Figure 4:
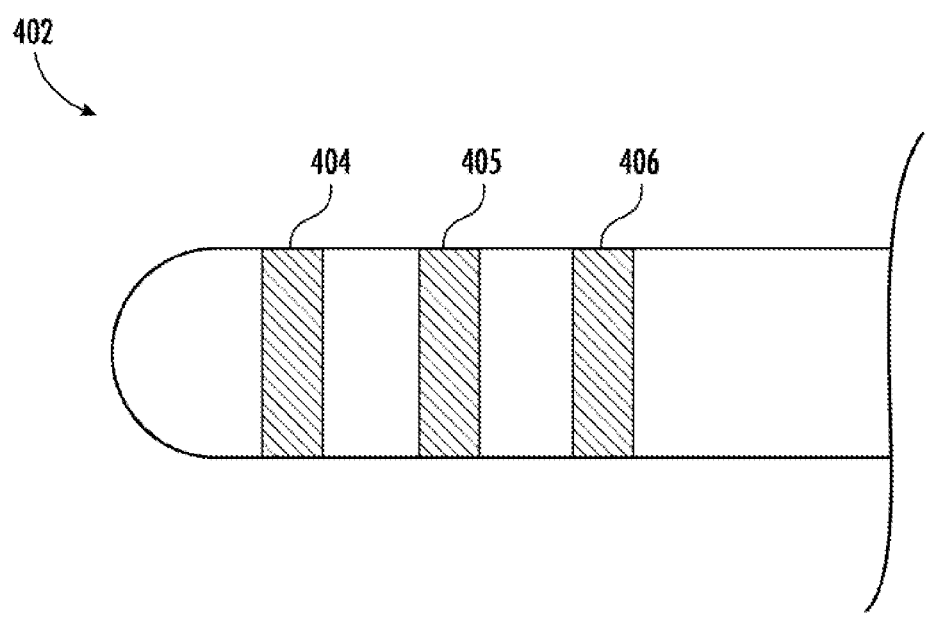
FIG. 4 shows an example of a linear catheter including multiple electrodes that may be used to map a cardiac area.

Multiple-electrode catheters may be implemented using any applicable shape such as a linear catheter with multiple electrodes, a balloon catheter including electrodes dispersed on multiple spines that shape the balloon, a lasso or loop catheter with multiple electrodes, or any other applicable shape. FIG. 4 shows an example of a linear catheter 402 including multiple electrodes 404, 405, and 406 that may be used to map a cardiac area. Linear catheter 402 may be fully or partially elastic such that it can twist, bend, and or otherwise change its shape based on received signal and/or based on application of an external force (e.g., cardiac tissue) on the linear catheter 402.

Figure 5:
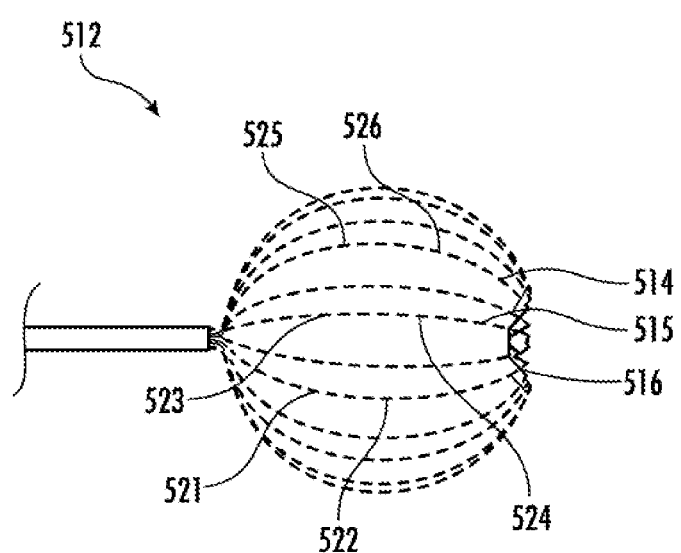
FIG. 5 shows an example of a balloon catheter including multiple splines (e.g., 12 splines in the specific example of FIG. 5) including splines and multiple electrodes on each spline including electrodes.

FIG. 5 shows an example of a balloon catheter 512 including multiple splines (e.g., 12 splines in the specific example of FIG. 5) including splines 514, 515, 516 and multiple electrodes on each spline including electrodes 521, 522, 523, 524, 525, and 526 as shown. The balloon catheter 512 may be designed such that when deployed into a patient's body, its electrodes may be held in intimate contact against an endocardial surface. As an example, a balloon catheter may be inserted into a lumen, such as a pulmonary vein (PV). The balloon catheter may be inserted into the PV in a deflated state such that the balloon catheter does not occupy its maximum volume while being inserted into the PV. The balloon catheter may expand while inside the PV such that electrodes on the balloon catheter are in contact with an entire circular section of the PV. Such contact with an entire circular section of the PV, or any other lumen, may enable efficient mapping and/or ablation.

Figure 6:
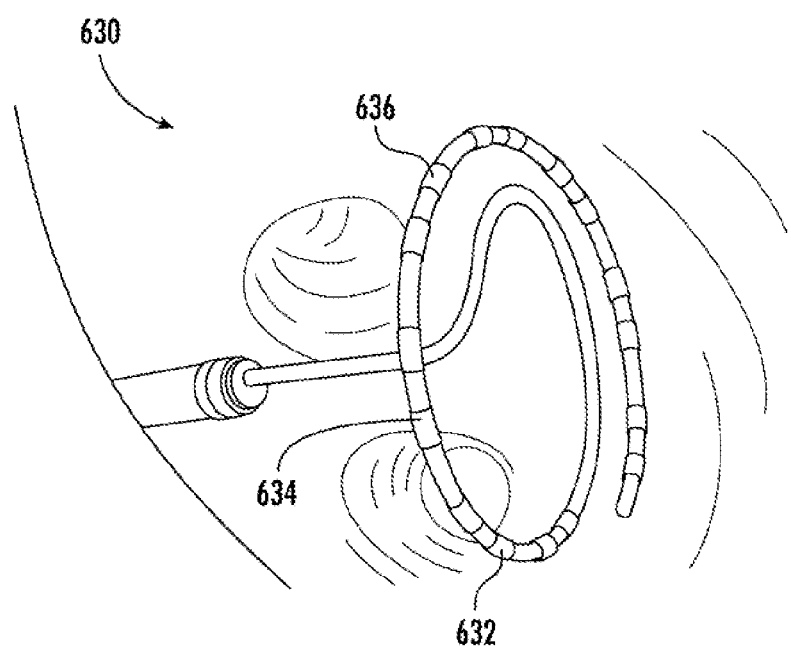
FIG. 6 shows an example of a loop catheter (also referred to as a lasso catheter) including multiple electrodes that may be used to map a cardiac area.

FIG. 6 shows an example of a loop catheter 630 (also referred to as a lasso catheter) including multiple electrodes 632, 634, and 636 that may be used to map a cardiac area. Loop catheter 630 may be fully or partially elastic such that it can twist, bend, and or otherwise change its shape based on received signal and/or based on application of an external force (e.g., cardiac tissue) on the loop catheter 630.

According to an example, a multi-electrode catheter may be advanced into a chamber of the heart. Anteroposterior (AP) and lateral fluorograms may be obtained to establish the position and orientation of each of the electrodes. Electrograms may be recorded from each of the electrodes in contact with a cardiac surface relative to a temporal reference such as the onset of the P-wave in sinus rhythm from a body surface ECG. The system, as further disclosed herein, may differentiate between those electrodes that register electrical activity and those that do not due to absence of close proximity to the endocardial wall. After initial electrograms are recorded, the catheter may be repositioned, and fluorograms and electrograms may be recorded again. An electrical map may then be constructed from iterations of the process above.

According to an example, cardiac mapping may be generated based on detection of intracardiac electrical potential fields. A non-contact technique to simultaneously acquire a large amount of cardiac electrical information may be implemented. For example, a catheter having a distal end portion may be provided with a series of sensor electrodes distributed over its surface and connected to insulated electrical conductors for connection to signal sensing and processing means. The size and shape of the end portion may be such that the electrodes are spaced substantially away from the wall of the cardiac chamber. Intracardiac potential fields may be detected during a single cardiac beat. According to an example, the sensor electrodes may be distributed on a series of circumferences lying in planes spaced from each other. These planes may be perpendicular to the major axis of the end portion of the catheter. At least two additional electrodes may be provided adjacent at the ends of the major axis of the end portion. As a more specific example, the catheter may include four circumferences with eight electrodes spaced equiangularly on each circumference. Accordingly, in this specific implementation, the catheter may include at least 34 electrodes (32 circumferential and 2 end electrodes).

According to another example, an electrophysiological cardiac mapping system and technique based on a non-contact and non-expanded multi-electrode catheter may be implemented. Electrograms may be obtained with catheters having multiple electrodes (e.g., between 42 to 122 electrodes). According to this implementation, knowledge of the relative geometry of the probe and the endocardium may be obtained such as by an independent imaging modality such as transesophageal echocardiography or 2D or 4D intracardiac echocardiogram (ICE). After the independent imaging, non-contact electrodes may be used to measure cardiac surface potentials and construct maps therefrom. This technique may include the following steps (after the independent imaging step): (a) measuring electrical potentials with a plurality of electrodes disposed on a probe positioned in the heart; (b) determining the geometric relationship of the probe surface and the endocardial surface; (c) generating a matrix of coefficients representing the geometric relationship of the probe surface and the endocardial surface; and (d) determining endocardial potentials based on the electrode potentials and the matrix of coefficients.

According to another example, a technique and apparatus for mapping the electrical potential distribution of a heart chamber may be implemented. An intra-cardiac multielectrode mapping catheter assembly may be inserted into a patient's heart. The mapping catheter assembly may include a multi-electrode array with an integral reference electrode, or, preferably, a companion reference catheter. The electrodes may be deployed in the form of a substantially spherical array. The electrode array may be spatially referenced to a point on the endocardial surface by the reference electrode or by the reference catheter which is brought into contact with the endocardial surface. The preferred electrode array catheter may carry a number of individual electrode sites (e.g., at least 24). Additionally, this example technique may be implemented with knowledge of the location of each of the electrode sites on the array, as well as a knowledge of the cardiac geometry. These locations are preferably determined by a technique of impedance plethysmography.

According to another example, a heart mapping catheter assembly may include an electrode array defining a number of electrode sites. The mapping catheter assembly may also include a lumen to accept a reference catheter having a distal tip electrode assembly which may be used to probe the heart wall. The mapping catheter may include a braid of insulated wires (e.g., having 24 to 64 wires in the braid), and each of the wires may be used to form electrode sites. The catheter may be readily positionable in a heart to be used to acquire electrical activity information from a first set of non-contact electrode sites and/or a second set of in-contact electrode sites.

According to another example, another catheter for mapping electrophysiological activity within the heart may be implemented. The catheter body may include a distal tip which is adapted for delivery of a stimulating pulse for pacing the heart or an ablative electrode for ablating tissue in contact with the tip. The catheter may further include at least one pair of orthogonal electrodes to generate a difference signal indicative of the local cardiac electrical activity adjacent the orthogonal electrodes.

According to another example, a process for measuring electrophysiologic data in a heart chamber may be implemented. The method may include, in part, positioning a set of active and passive electrodes into the heart, supplying current to the active electrodes, thereby generating an electric field in the heart chamber, and measuring the electric field at the passive electrode sites. The passive electrodes are contained in an array positioned on an inflatable balloon of a balloon catheter. In preferred embodiments, the array is said to have from 60 to 64 electrodes.

According to another example, cardiac mapping may be implemented using one or more ultrasound transducers. The ultrasound transducers may be inserted into a patient's heart and may collect a plurality of ultrasound slices (e.g., two dimensional or three-dimensional slices) at various locations and orientations within the heart. The location and orientation of a given ultrasound transducer may be known and the collected ultrasound slices may be stored such that they can be displayed at a later time. One or more ultrasound slices corresponding to the position of a probe (e.g., a treatment catheter) at the later time may be displayed and the probe may be overlaid onto the one or more ultrasound slices.

According to other examples, body patches and/or body surface electrodes may be positioned on or proximate to a patient's body. A catheter with one or more electrodes may be positioned within the patient's body (e.g., within the patient's heart) and the position of the catheter may be determined by a system based on signals transmitted and received between the one or more electrodes of the catheter and the body patches and/or body surface electrodes. Additionally, the catheter electrodes may sense biometric data (e.g., LAT values) from within the body of the patient (e.g., within the heart). The biometric data may be associated with the determined position of the catheter such that a rendering of the patient's body part (e.g., heart) may be displayed and may show the biometric data overlaid on a shape of the body part, as determined by the position of the catheter.

CT/MRI and/or ultrasound images may contain the most accurate anatomical reference. Such images can include well known anatomical landmarks used by a physician to achieve final registration. However, CT/MRI and ultrasound images lack information captured by a FAM including, for example, information that is needed to identify the source of an arrythmia. As described above, the FAM often includes undesired data points including, for example, wrong wall positions due to respiration-induced movement, overextension of the catheter against the cardiac wall during mapping, points that lack stability/touch/arrythmia pattern, or various other reasons. Also, a FAM map is built from continuous catheter positions that capture the whole cardiac cycle, resulting in the shape of the heart being represented by its maximal volume at every point (which is not accurate).

Figure 7:
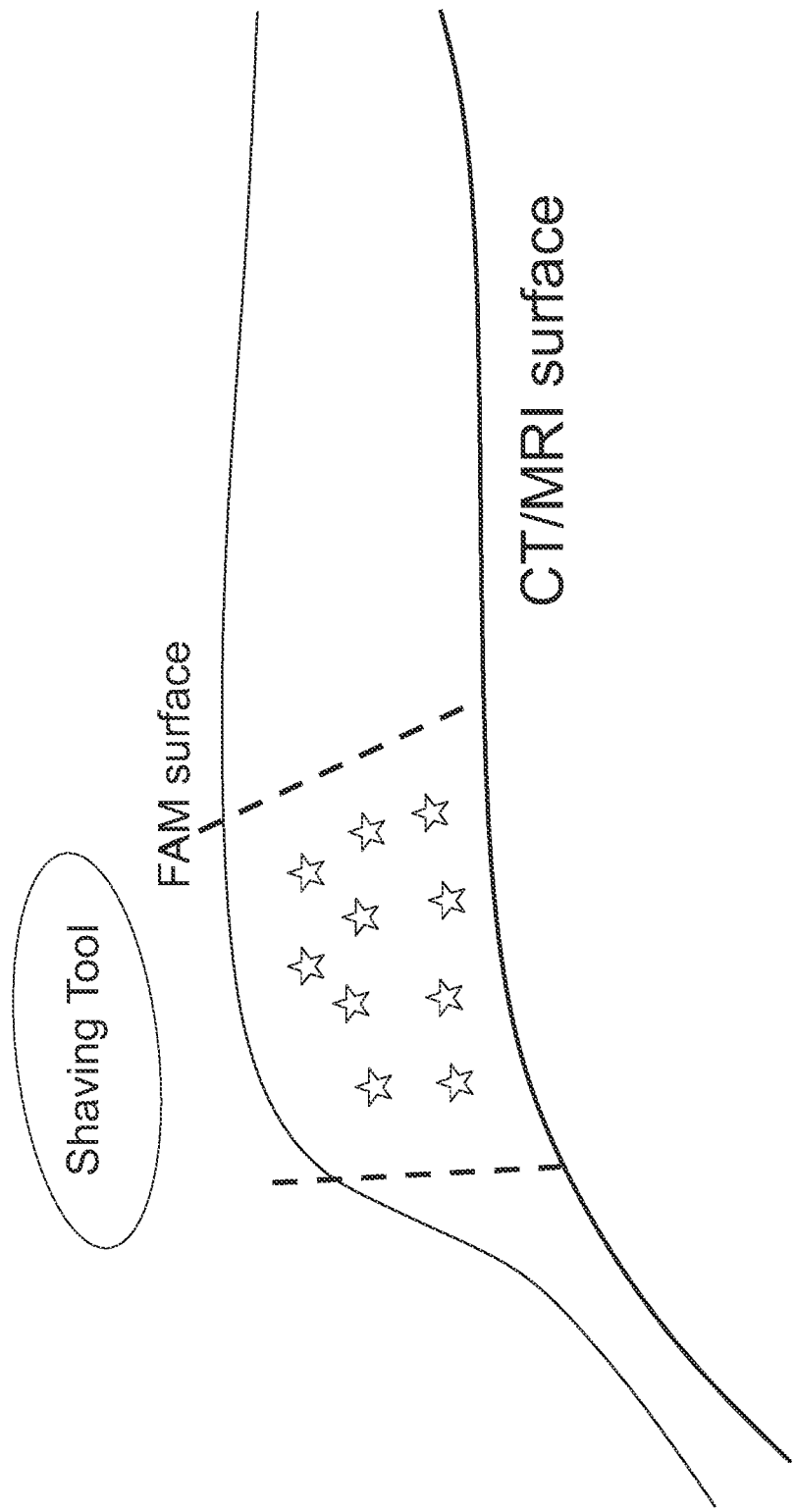
FIG. 7 illustrates a technique for shaving a FAM using a reference image.

Referring now to FIG. 7, a technique for shaving a FAM to account for undesired data points is shown. In FIG. 7, computed surface 701 represents the reference image, and surface 702 represents the computed surface of the FAM. Surface 701 corresponds to a reference image such as a CT image, MRI image, ultrasound image, or an electroanatomical map shaved during a prior electrophysiological investigation of the same patient. A user interface associated with workstation 55 is used to input one or more accuracy parameters. In the example shown, accuracy parameters corresponding to a maximal distance of 2 mm and 80% Tissue Proximity Index (or "TPI", explained below) are used. Indications (in this example, stars 703) correspond to areas where one or both of the accuracy parameters are met, i.e., for each star 703 either the distance between surfaces 701 and 702 is less than 2 mm, the TPI of the data points is greater than 80%, or both. Stars 704 correspond to areas where both of the accuracy parameters are not met. The space between the dotted lines 705 corresponds to the region of interest covered by the shaving tool. In some embodiments, the size of the region of interest between the dotted lines is configurable by the user. The shaving tool includes a user interface that displays oval 706. Oval 706 is a top view of the area between dotted lines 705. Oval 706 provides a visual indication on the user interface (e.g., display screen 20) of an area on the FAM map that fails to meet the specified accuracy parameters. In the technique illustrated in FIG. 7, the map is revised by shaving surface 702 (in the region between dotted lines 705) so as to remove all or part of the depth represented by stars 704. In other examples, one or more other accuracy parameters including, e.g., qualified points (defined by the Smart-index, for example, or by signal quality), points acquired manually, existence of visitags, and/or point-density can be used as an alternative or in addition to a TPI or distance from the surface.

Referring still to FIG. 7, in one embodiment, shaving of surface 702 is initiated in response to a manual input from a user when oval 706 is positioned over the area to be shaved on display screen 20. In a still more specific embodiment, the entirety of the depth represented by stars 704 is removed in response to a single manual input from the user (e.g., clicking a mouse). Thus, if 6 mm needs to be shaved from surface 702 to remove the depth represented by stars 704, all 6 mm are be shaved (in one step) in response to the single manual input from the user. This represents an improvement over more time-consuming manual shaving systems where only a limited depth (e.g., 2 mm) can be shaved at a time, as they require the user to perform multiple shaving iterations to shave to the desired depth. In an alternative embodiment, shaving of surface 702 is automated, and is performed without the user, for example, without the user needing to click a mouse to individually shave each area of the map where the accuracy parameters are not met. In an example of such an automated mode, all excessive areas are automatically erased by the system according to criteria chosen by the user prior to mapping. Alternatively, an automated mode is implemented to shave a layer (for example 5 mm) from the whole map without specifying a region to shave.

Figure 8A:
FIGS. 8A-8D are exemplary maps illustrating aspects of the shaving technique described in connection with FIG. 7.
Figure 8B:
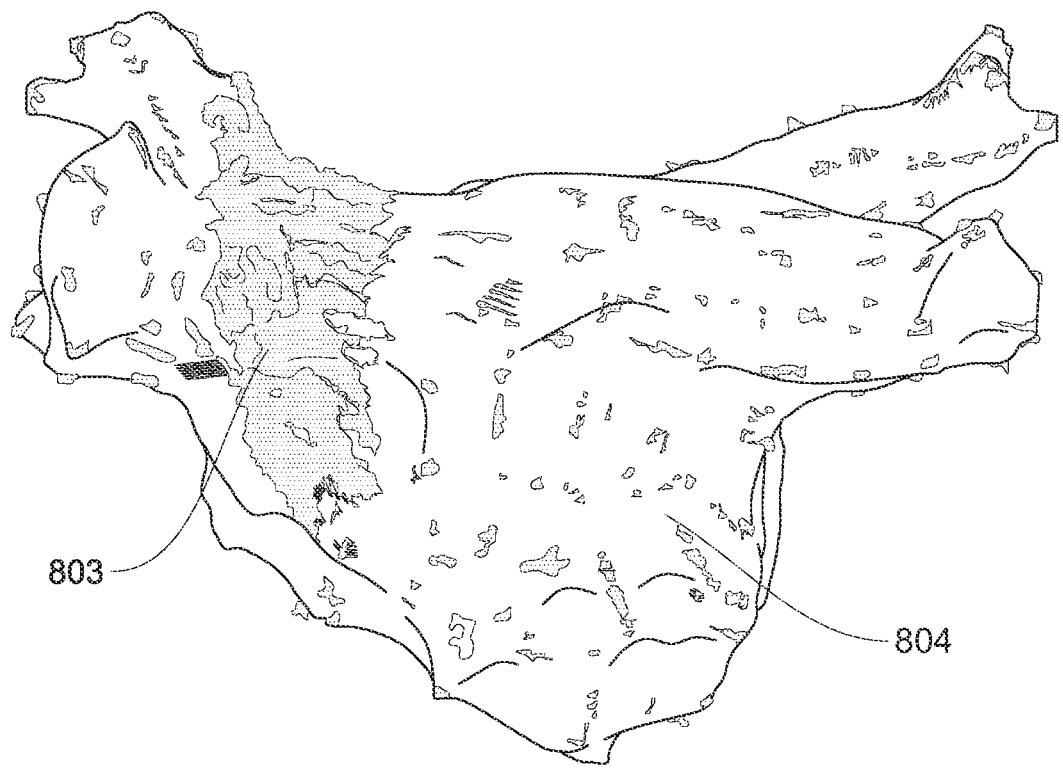
Figure 8C:
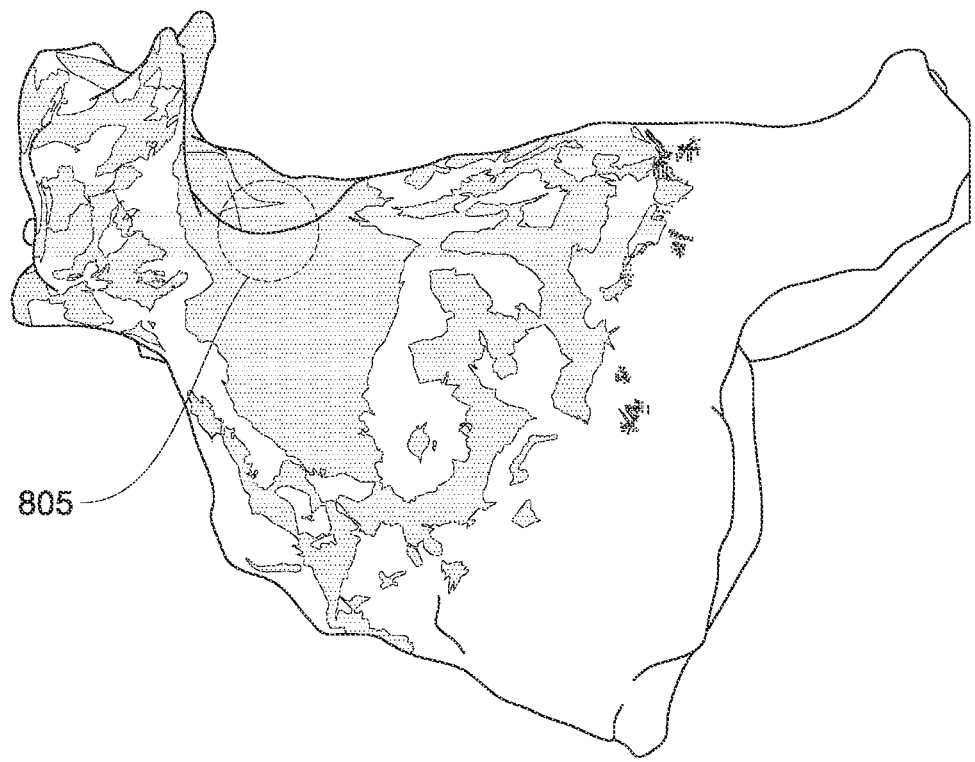
Figure 8D:
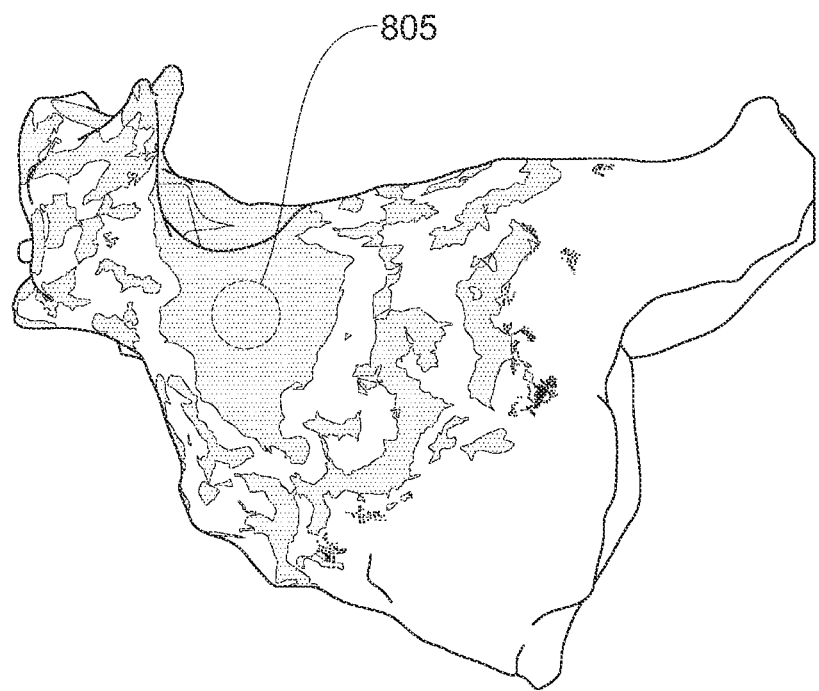

FIGS. 8A-8D are exemplary maps illustrating aspects of the shaving technique described in connection with FIG. 7. In FIG. 8A, (gray) surface 801 corresponds to a FAM map and the brown (semi transparent) corresponds to the reference surface 802. In FIG. 8B, the volume 803 that needs to be shaved is displayed (orange) on top of the reference map (gray) 804. From FIG. 8B, it can be observed that different areas need different layers of shaving, i.e., some areas need to be shaved by a greater depth and some areas need shaving by a lesser depth. In FIGS. 8C and 8D, a shaving circle 805 (analogous to oval 706 in FIG. 7) is shown. In FIG. 8C, shaving circle 805 is positioned on an area where several layers need to be shaved, while in FIG. 8D shaving circle 805 is displayed on an area where only one layer of shaving is needed. In FIGS. 8C and 8D, the relative differences between the FAM and the reference image are represented by the brown areas exceeding the gray reference areas.

Figure 9:
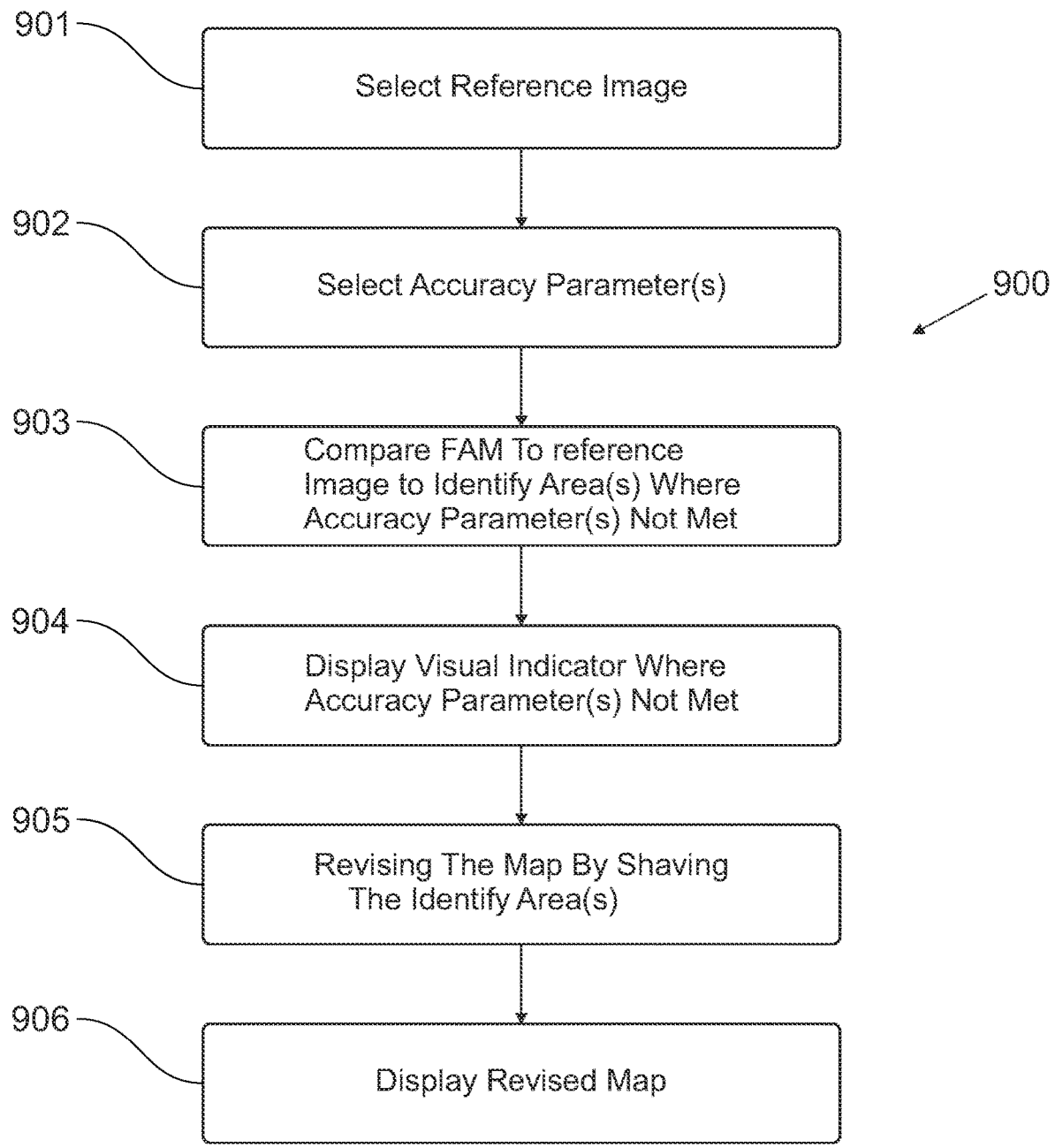
FIG. 9 illustrates a method of shaving an electroanatomical map using a reference image.

FIG. 9 illustrates a method 900 of shaving an electroanatomical image (such as a FAM) using a reference image. In step 901, a reference image (e.g., a CT image or MRI image or ultrasound image) is selected. In step 902, one or more accuracy parameters are selected. In one example, the user interface associated with workstation 55 is used to select the reference image and accuracy parameter(s). In step 903, the FAM is compared to the reference image to identify areas where the accuracy parameter(s) are not met. In step 904, a visual indication (e.g., oval 706) is provided on display screen 20 of one or more areas where the accuracy parameter (s) are not met. In step 905, the identified area(s) of the map are shaved, and the revised map is displayed (step 906).

In some embodiments, only a single accuracy parameter (e.g., maximal distance) is used to identify areas that require shaving. In other embodiments, more than one accuracy parameter is used. For example, both the maximal distance in combination with either a point quality value (such as a TPI, smart index) or point density value are used. The points in an electroanatomical mapping may be rated according to their quality level, like a quality index, which may also be referred to as a SMART Index. The quality score of a point is a weighted score of serval parameters. The score may be computed in real-time while acquisition of the points occurs. TPI stands for tissue proximity index (or contact pressure index), which indicates how proximal the catheter is to the tissue wall (e.g., whether the catheter touches the tissue or not). estimates contact force of a catheter electrode with a tissue wall during acquisition of the data point.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random-access memory (RAM), a read-only memory (ROM), an erasable programmable read-only memory (EPROM or Flash memory), a static random-access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for improving accuracy and efficiency of anatomical map revision in electrophysiological investigations by quality-gated, distance-constrained, single-action region-of-interest shaving registered to a reference image, the method comprising:
   receiving an anatomical map generated from data acquired by at least one electrode catheter;
   receiving the reference image and registering the reference image to the anatomical map using a rigid and/or non-rigid transformation thereby forming a registered reference image;
   receiving at least one accuracy parameter that includes (i) a maximum orthogonal distance threshold and (ii) at least one quality threshold comprising a tissue-proximity index, a SMART-Index value, or a point-density threshold;
   computing, for surface elements of the anatomical map, a shortest orthogonal distance to the registered reference image along local surface normals and a composite score that weights a normalized distance together with at least one of the quality thresholds;
   identifying at least one area that fails the at least one accuracy parameter by requiring that the maximum orthogonal distance exceed the threshold and the composite score meet a gating criterion;
   displaying, on a user interface, the anatomical map with a movable region-of-interest (ROI) overlay positioned over at least a portion of the area identified and with a preview that indicates a variable shave depth within the ROI;
   in response to a single user action, shaving the anatomical map within the ROI by removing surface geometry along the respective local surface normals by an amount equal to the distance computed to the registered reference image thereby generating a revised map, without using ablation catheter positions, ablation icons, or a body-of-revolution geometry;
   displaying the revised map.

2. The method of claim 1, wherein the anatomical map is a fast anatomical map (FAM) acquired during the electrophysiological investigation.

3. The method of claim 1, wherein the reference image is a CT image or an MRI image.

4. The method of claim 1, wherein the reference image is an ultrasound image.

5. The method of claim 1, wherein the reference image is an anatomical map shaved during a prior electrophysiological investigation.

6. The method of claim 1, wherein the shaving is manually initiated by a user viewing the visual indication.

7. The method of claim 1, wherein the identifying, displaying, and shaving are implemented by a workstation, and wherein the shaving is automatically initiated by the workstation to (i) erase areas that fail the at least one accuracy parameter or (ii) uniformly shave a predefined layer thickness from the anatomical map independently of the ablation catheter positions or the ablation icons.

8. The method of claim 1, wherein the maximum distance threshold is defined as a shortest orthogonal inter-surface distance between a surface of the anatomical map and a surface of the registered reference image computed along local surface normals.

9. The method of claim 1, wherein the at least one accuracy parameter further comprises a point-density value.

10. The method of claim 1, wherein the at least one accuracy parameter further comprises a point-quality value.

11. The method of claim 10, wherein the point-quality value corresponds to a SMART-Index value.

12. The method of claim 1, wherein the at least one accuracy parameter is user-configurable during the electrophysiological investigation.

13. The method of claim 1, wherein the anatomical map is an electroanatomical map.

14. A system for improving accuracy and efficiency of anatomical map revision in electrophysiological investigations by quality-gated, distance-constrained, single-action region-of-interest shaving registered to a reference image, the system comprising:
- at least one processor communicatively coupled to memory;
- a display; and
- a user interface;
- wherein the at least one processor is configured to:
  - receive, at least one accuracy parameter that includes a maximum orthogonal distance threshold and at least one quality threshold comprising a tissue-proximity index, a SMART-Index value, or a point-density threshold;
  - receive the reference image and register the reference image to an anatomical map thereby forming a registered reference image;
  - compute, for surface elements of the anatomical map, a shortest orthogonal distance to the registered reference image and a composite score that weights a normalized distance with at least one of the quality thresholds;
  - identify at least one area in the anatomical map that fails the at least one accuracy parameter;
  - display, on the display, the anatomical map with a movable ROI overlay positioned over the at least one area and with a shave-depth preview;
  - in response to a single user action received via the user interface, shave the anatomical map within the ROI by removing surface geometry along local surface normals by an amount equal to the distance computed to the registered reference image thereby generating a revised map, without using ablation catheter positions, ablation icons, or a body-of-revolution geometry; and
  - display the revised map on the display.

15. The system of claim 14, further comprising at least one electrode catheter operatively coupled to the at least one processor, wherein the at least one processor generates the anatomical map using data acquired by the at least one electrode catheter, and wherein the anatomical map is a fast anatomical map (FAM).

16. The system of claim 14, wherein the reference image is one of a CT image, an MRI image, an ultrasound image, or an anatomical map shaved during a prior electrophysiological investigation.

17. The system of claim 14, wherein shaving is initiated in response to a single user action to shave within the ROI an amount of surface geometry sufficient to reduce, within the ROI, the anatomical map to the registered reference image along local surface normals.

18. The system of claim 14, wherein the maximum distance threshold is defined as a shortest orthogonal intersurface distance between a surface of the anatomical map and a surface of the registered reference image computed along local surface normals.

19. The system of claim 14, wherein the at least one accuracy parameter further comprises a point-density value or a point-quality value comprising the tissue-proximity index or the SMART-Index value.

20. The system of claim 14, wherein the anatomical map is an electroanatomical map.

* * * * *